United States Patent [19]
Elwalid

[11] Patent Number: 5,646,943
[45] Date of Patent: Jul. 8, 1997

[54] METHOD FOR INTEGRATED CONGESTION CONTROL IN NETWORKS

[75] Inventor: Anwar Elwalid, Murray Hill, N.J.

[73] Assignee: Lucent Technologies Inc., Murray Hill, N.J.

[21] Appl. No.: 747,984

[22] Filed: Nov. 12, 1996

Related U.S. Application Data

[63] Continuation of Ser. No. 366,516, Dec. 30, 1994, abandoned.

[51] Int. Cl.$^6$ ..................................... H04J 3/14
[52] U.S. Cl. .................. 370/230; 370/235; 370/439; 370/538
[58] Field of Search ..................... 370/230, 231, 370/232, 233, 234, 235, 236, 252, 253, 439, 538

[56] References Cited

U.S. PATENT DOCUMENTS

| | | | |
|---|---|---|---|
| 5,289,462 | 2/1994 | Ahmadi et al. | 370/94.1 |
| 5,313,454 | 5/1994 | Bustini et al. | 370/94.1 |
| 5,341,366 | 8/1994 | Soumiya et al. | 370/17 |
| 5,359,593 | 10/1994 | Derby et al. | 37/94.1 |
| 5,367,523 | 11/1994 | Chang et al. | 370/84 |
| 5,426,635 | 6/1995 | Mitra et al. | 370/60 |
| 5,488,609 | 1/1996 | Hluchyj et al. | 370/84 |
| 5,497,375 | 3/1996 | Hluchyj et al. | 370/85.2 |

OTHER PUBLICATIONS

"Analysis of Dynamic Congestion Control Protocols–A Fokker–Planck Approximation," Amarnath Mukherjee and John C. Strikwerda, *Association of Computing Machinery*, 159–169 (1991).

"Dynamical Behavior of Rate–Based Flow Control Mechanisms," Jean–Chrysostome Bolot, and A. Udaya Shankar, *ACM SIGCOMM Computer Comm. Rev.*, vol. 30, 35–49 (1990).

"On the Performance of Submitting Excess Traffic to ATM Networks," B. A. Makrucki, *GLOBECOM*, 0281–0288 (1991).

"Controlling Congestion in B–ISDN/ATM: Issues and Strategies," Adrian E. Eckberg, Bharat T. Doshi and Richard Zoccolillo, *IEEE Communicatons Magazine*, 64–70 (Sep. 1991).

"Analysis and design of rate–based congestion control of high speed networks, I: stochastic fluid models, access regulation," Anwar I. Elwalid, Debasis Mitra, *Queueing Systems*, 29–63 (Apr. 25, 1994).

"A unified set of proposals for control and design of high speed data networks," D. Mitra, I. Mitrani, K. G. Ramakrishnan, J. B. Seery and A. Weiss, *Queueing Systems*, 215–234 (Apr. 22, 1991).

"Statistical Multiplexing with Loss Priorities in Rate–Based Congestion Control High–Speed Networks," Anwar I. Elwalid, Debases Mitra, *IEEE Transactions on Communications*, vol. 42, No. 11, 2989–3002 (Nov. 1994).

*Primary Examiner*—Douglas W. Olms
*Assistant Examiner*—Shick Hom
*Attorney, Agent, or Firm*—Katharyn E. Olson; Robert E. Rudnick

[57] ABSTRACT

An integrated method for congestion control uses access regulator to control the admission of information from a communication device into a network according to a predetermined function characterized by a set of parameters. A node within the network sends a signal indicating a level of congestion in the node to the access regulator, and at least one of the parameters is adjusted in response to the signal. The parameter may additionally be adjusted according to other parameters which are selected according to stability and transient response criteria.

7 Claims, 4 Drawing Sheets

METHOD FOR INTEGRATED CONGESTION CONTROL IN NETWORKS

This application is a continuation of application Ser. No. 08/366,516, filed on Dec. 30, 1994 now abandoned.

TECHNICAL FIELD

The invention relates to methods for controlling congestion in networks.

BACKGROUND OF THE INVENTION

Networks are a principal means of exchanging or transferring information (e.g, data, voice, text, video, etc.) among communication devices (i.e. devices for inputting and/or outputting information such as computer terminals, multimedia workstations, fax machines, printers, servers, telephones, videophones, etc.) connected to the network. The use of networks for the reliable, high speed transport of information between communication devices over wide areas in digital format is bringing major changes to network services and network architecture/infrastructure design. Many new services having diverse characteristics (e.g. different bit rates) are now feasible. One emerging example of such a network is Broadband ISDN (BISDN). BISDN is designed to support a variety of applications such as interactive and distributed audio, video and data communications. The principal transfer mode for BISDN is called Asynchronous Transfer Mode (ATM). ATM is a high bandwidth, low-delay, packet-like switching and multiplexing technique. See, S. E. Minzer, "Broadband ISDN and Asynchronous Transfer Mode," *IEEE Comm. Mag.*, pp. 17–24, September 1989.

A network typically comprises switching nodes connected to each other, and to communication devices, by links. Each link is characterized by a bandwidth or link capacity. Information input from the communication devices to the network may be of any form but is often formatted into fixed-length packets or cells. When information is to be exchanged between two communication devices, a path (comprising a set of nodes and links connecting the two communication devices) is established. This path is a so-called "virtual circuit" (VC) by which it is meant that a communication device simply specifies the destination for the information, and the network delivers the information as though a dedicated circuit connected the two communication devices. Although a number of different paths could be chosen initially, once established, the path typically remains established until the information exchange is complete. Cells in transit between communication devices may temporarily be stored in buffers at nodes along the path of the virtual circuit pending sufficient available bandwidth on an outgoing link from the node.

An important consideration in network operation is traffic control, i.e. the process of controlling the amount of information entering and traversing the network. Traffic control mechanisms are of three general types, each with different objectives. See, generally, William Stallings, "Data and Computer Communications," 4th Ed., McMillan Pub. Co., New York, 1991. The first type of traffic control, flow control, deals with the regulation of the rate of data transmission between two points. The second type of traffic control is deadlock avoidance in which various techniques are used to minimize conditions under which a node is unable to forward packets because no buffers are available in a subsequent node along the path. Congestion control is the third type of traffic control. The objective of congestion control is to maintain the amount of information (e.g. the number of cells) within the network below a level at which performance (e.g. throughput delay, cell loss, etc.) becomes unacceptable. More particularly, the objective of congestion control is to limit the fullness of buffers at nodes in the network so as to avoid cell loss or delay. Thus, congestion control may require overhead in that a portion of the capacity of the network is dedicated to carrying congestion information rather than to carrying information input from communication devices.

Congestion control may be of the "open-loop" type of control in which a requested VC is established within the network based on the requested VC's declared parameters or characteristics (e.g. mean rate, peak rate and burst size), the network state (i.e. the network topology and current available network resources such as buffer space in the nodes and capacity in the links) and given any quality-of-service requirements (e.g. guaranteed bandwidth or maximum cell loss probability) made to users of devices in the network. The VC is then monitored in real time, as for example by an access regulator, and is restricted to conform to its declared parameters. See, e.g. A. E. Eckberg, et al., "An Approach to Controlling Congestion in ATM Networks," *International Journal on Digital and Analog Communication Systems*, Vol. 3, pp. 199–209, 1990. Open loop control, however, does not permit a system to modify the declared parameters to react to (i.e. it is non-dynamic with respect to) changing network conditions (e.g. to take advantage of an increase in the bandwidth available on a link at a node due to termination of other VCs routed through the node).

Congestion control may also be of the "feedback" type of control as used in data networks in which a node generates or controls a feedback signal which is used to indicate a level of congestion in the vicinity of the node. The congestion level is indicative of the extent to which a cell arriving at the node may be delayed or lost within the node. Thus, a level of congestion may be reflected by the number of cells in transit through the node, the content level of a node buffer, the throughput delay at the node, the probability or amount of cell loss at the node, etc. The feedback signal is received at a communication device, and then the communication device regulates the admission of new information into the network in response to the level of congestion indicated by the feedback signal. One such technique is described in D. Mitra and J. B. Seery, "Method for Adaptive Control of Windows and Rates in Networks," Ser. No. 08/118531, filed Sep. 8, 1993 and assigned to the assignee of this invention. See also, R. Jain and K. Ramakrishnan, "Congestion Avoidance in Computer Networks with Connectionless Network Layer: Concepts, Goals, and Methodology," *Proc. Computer Networking Symposium*, April 1988. However, traditional data networks typically do not perform functions to control admission of new VCs into the network. Hence, when many VCs are admitted, excessive throughput delays may be encountered. Additionally, feedback congestion control methods may encounter stability problems in cases where the feedback is delayed in reaching the communication device.

SUMMARY OF THE INVENTION

The inventive method recognizes that the open-loop and feedback congestion control techniques can advantageously be integrated to overcome the non-dynamic nature of open-loop control and the delay and stability problems of feedback control. The method regulates, according to a predetermined function characterized by at least a first parameter, admission of information from a communications device to a network and adjusts the first parameter in response to a signal received from a node in the network where the signal indicates a level of congestion at the node. In preferred embodiments, an access regulator controls the admission of information to the network according to the predetermined function. In an aspect of the invention, the predetermined function of the access regulator is characterized by a token rate parameter where the token rate parameter is set responsive to the signal. In another aspect of the invention, the feedback signal indicates a difference between the level of congestion at the node and a target level, and the rate parameter is adjusted as a function of the feedback signal and other selected parameters. Thus, the inventive method solves shortcomings of prior methods in that the inventive method reacts to changing conditions within the network, and proper choice of the selected parameters insures stability of the inventive method in controlling congestion in the network.

DETAILED DESCRIPTION

Introduction

The detailed description of the inventive method for congestion control is divided into three sections. The first section presents an overview of the inventive method for congestion control in a node in a network. This overview first illustrates operation of the inventive method at a node in a network for a single communication device (or source) connected to the node where information from the source to the network is regulated according to a predetermined function characterized by a set of parameters. For illustrative purposes, the regulation of information is by an access regulator. The overview then specifies how access regulator parameters characterizing the predetermined function may be advantageously adjusted as a function of a feedback signal from the node. In particular the overview also describes how a rate parameter characterizing an access regulator may be adjusted where the feedback signal indicates the difference between a buffer content level of the node and a target value. In a feature of the inventive method, the rate parameter is also adjusted according to a damping constant and gain parameter, and the selection of the gain constant and damping parameter is discussed. Finally, the overview illustrates an application of the inventive method to a situation in which multiple sources are connected to a node. The second section of the detailed description provides a more rigorous presentation of the inventive method. The final section provides a summary and conclusion.

Overview of a Method for Integrated Congestion Control

Figure 1:
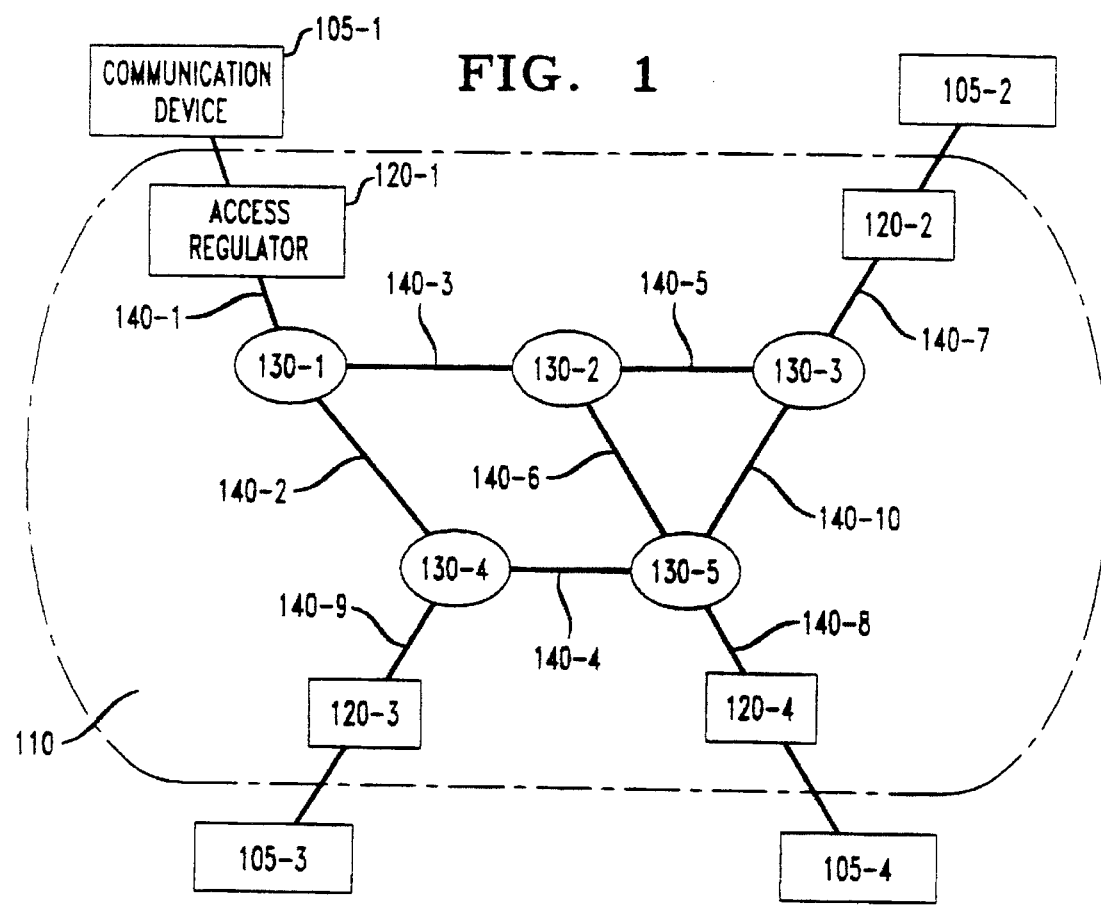
FIG. 1 illustrates a network in which the inventive method may be practiced.

FIG. 1 illustrates a network in which the inventive integrated congestion control method may be practiced. Network 110 comprises access switching nodes 130-i and links 140-k. Network 110 also comprises means 120-j for regulating, according to a predetermined function characterized by at least one parameter, admission of information from communication device 105-j to network 110. In preferred embodiments, means 120-j is an access regulator. For illustrative purposes, access regulator 120-j will be considered to be a leaky bucket regulator (LBR) and hereinafter will be referred to as such. However, that other types of access regulators known in the art, e.g. buffered leaky bucket regulators or cascaded LBRs, may be used. See, e.g. A. I. Elwalid and D. Mitra, "Analysis and Design of Rate-Based Congestion control of High Speed Networks, I: Stochastic Fluid Models, Access Regulation," *Queueing Systems, Theory and Application*, Vol. 9, pp. 29–64, 1991. Returning to FIG. 1, communication device 105-j generates information for use by, or receives information from, other communication devices in the network. By information it is meant data, text, voice, video, etc. Communication device 105-j may include such apparatus (e.g. analog-to-digital converters) so as to render the information suitable for transmission on network 110.

Figure 2:
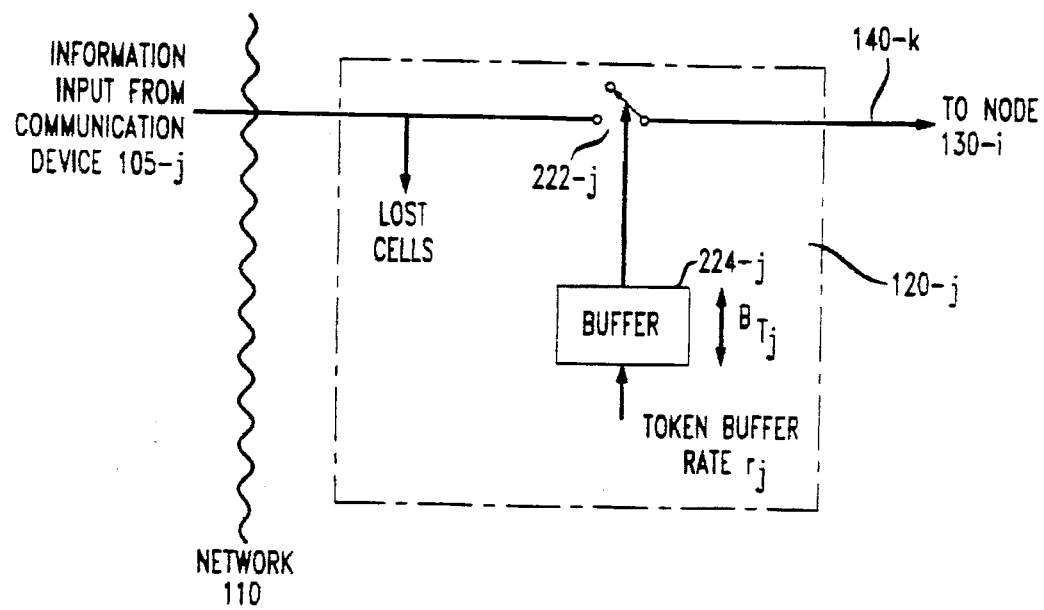
FIG. 2 illustrates the components of a leaky bucket access regulator.

The operation of leaky bucket regulator 120-j is shown conceptually in FIG. 2. Leaky bucket regulator 120-j comprises switch 222-j and buffer 224-j. LBR 120-j accepts information from communication device 105-j. The information from communication device 105-j is illustratively formatted into packets or cells. Switch 222-j is closed, and therefore data is output from LBR 120-j only when a token is available in buffer 224-j. Buffer 224-j is of size $B_{T_j}$. Tokens are supplied to the buffer at rate $r_j$, and a token is used, and thus is no longer available in the buffer, each time a specified amount of information (e.g. a cell) is output from the LBR. Information is output from LBR 120-j at a maximum rate of $P_j$. Thus, LBR 120-j regulates the admission of information according to a function of a set of three parameters: the token rate $r_j$ which bounds the long-term average rate of information output from LBR 120-j, the token buffer size $B_{T_j}$ which bounds the burst size of the information, and a peak rate $P_j$ which bounds the rate at which information may leave LBR 120-j.

In the illustrative LBR 120-j of FIG. 2, if communication device 105-j inputs cells to LBR 120-j at a rate so great that the buffer underflows, cells will be lost. However, the LBR may be of the type in which, when no tokens are available, cells are "marked" as low priority cells; the marked cells are then routed through the network on a VC but are first to be dropped if congestion is encountered at nodes along the VC. Thus, regardless of the type of regulator used, communication device 105-j must contract with the network when establishing the VC for access regulator parameters sufficient to ensure a maximum tolerable cell loss.

Returning to FIG. 1, in order for communication device 105-1 to transmit information to communication device 105-2, a virtual circuit (VC) needs to be established between them. The VC is a path comprising a set of nodes and set of links between the LBRs associated with communication devices 105-1 and 105-2. For example in FIG. 1, the VC between communication device 105-1 and 105-2 could comprise nodes 130-1,130-2, 103-3 and links 140-1,140-3, 140-5 and 140-7. Each node 130-i has associated with it at least one buffer of size $B_{N_i}$, and each link has associated with it a bandwidth capacity $C_k$.

Figure 3:
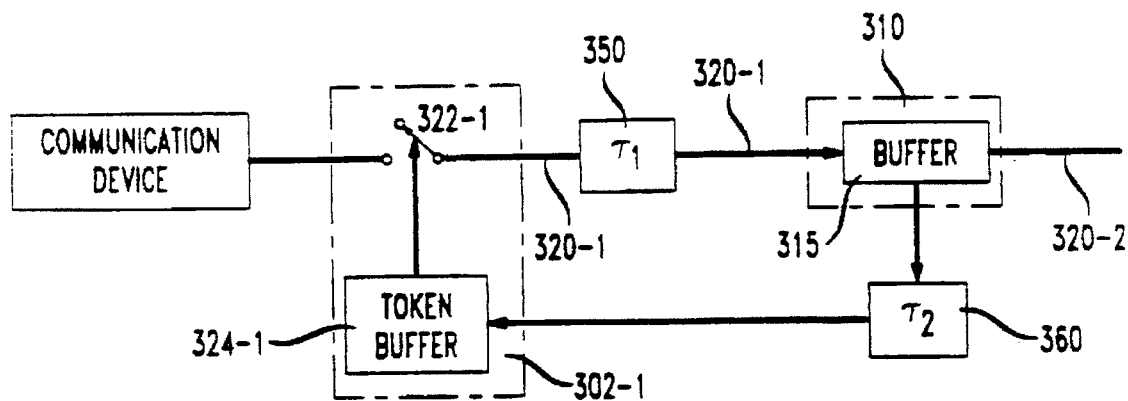
FIG. 3 illustrates operation of an embodiment of the inventive method in a network.

FIG. 3 illustrates operation of an embodiment of the inventive method in a network of the type in FIG. 1. A VC comprising links 320-1 and 320-2 is routed from communication device 301-1 through node 3 10 (i.e. communication device 301-1 acts as a "source" of information). Link 320-1 is characterized by a propagation delay $\tau_1$ between source 301-1 and node 310. Node 310 comprises buffer (or queue) 315 connected to outgoing link 320-2. Source 301-1 is monitored and regulated by associated access regulator 302-1 which is illustratively shown as the leaky bucket regulator of FIG. 2, i.e. access regulator 302-1 comprises switch 322-1 and token buffer 324-1. Source 301-1 is capable of transmitting large bursts of information (e.g. as in file transfer applications).

Node 310 returns to access regulator 302-1 (as for example via a bidirectional channel in the VC) a feedback signal containing information on the congestion status of the node buffer. The feedback signal reaches access regulator 302-1 after a propagation delay of $\tau_2$. The feedback information on the buffer status may be explicitly obtained using forward and backward congestion notifications or implicitly from time response measurements as is well known in the art. See, e.g. K. W. Fendick et at., "Analysis of Rate-Based Feedback Control Strategy for Long Haul Data Transport," *Performance Evaluation*, Vol. 16, pp. 67–94, 1992. Access regulator 302-1 has an associated set of parameters characterizing the flow of information from source 301-1 (e.g. the source's mean rate, peak rate and variability/burstiness). Each source's parameters are negotiated between the source and the network and are the basis of the establishing of VCs requested by the sources to the network.

One parameter of leaky bucket regulator 302-1 is the token rate $r_1$ which controls the average rate (throughput) of information output from LBR 302-1. In a preferred embodiment, the inventive method controls the token rate $r_1$ according to the rule:

$$\frac{d}{dt} r_1(t) = -a[x(t-\tau_2) - \bar{x}] - \gamma r_1(t) \tag{1}$$

which, in the discrete time context where $$\frac{d}{dt} r_1(t) = \frac{r_1(t+\Delta) - r_1(t)}{\Delta}$$

for small $\Delta$, where $\Delta$ is a period of adaptation, can be written as $$r_1(t+\Delta) = r_1(t)[1-\gamma\Delta] - a[x(t-\tau_2) - \bar{x}]\Delta \tag{2}$$

$\bar{x}$ is a target value for the content level of buffer 315, x is the content level of buffer 315, a is a gain parameter and $\gamma$ is a damping constant. The above equations indicate that the rate of information output from an access regulator can be adapted to the congestion level at a node by regulating a parameter (e.g. the token rate) of the access regulator, where the congestion level at the node is measured relative to a target value for the content of the buffer node. Thus, an appropriate choice of $\bar{x}$, a, and $\gamma$ will result in an increase (decrease) in r(t) when congestion is low (high). In short, the parameters of the access regulator are adjusted so as to maintain an acceptable queuing delay at buffer node 315. The rate $r_1$ can advantageously be limited to a range in which the minimum value of $r_1$ is the value initially contracted for when the VC was established. The maximum value of $r_1$ is advantageously selected based on desired dynamic range and transient response characteristics as shown below.

Figure 4:
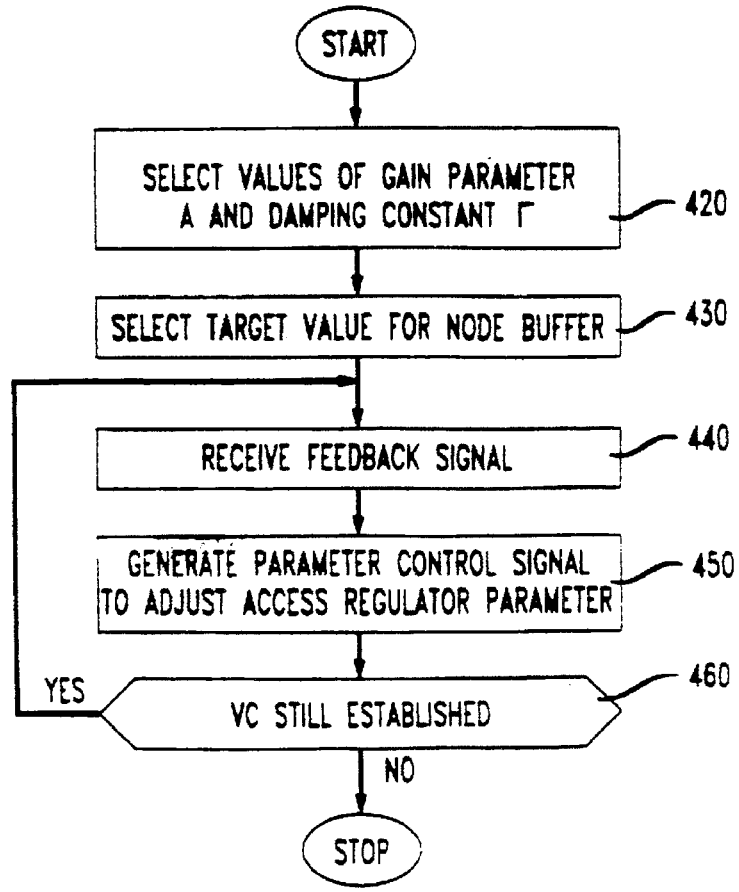
FIG. 4 illustrates the steps in the inventive method.
Figure 5:
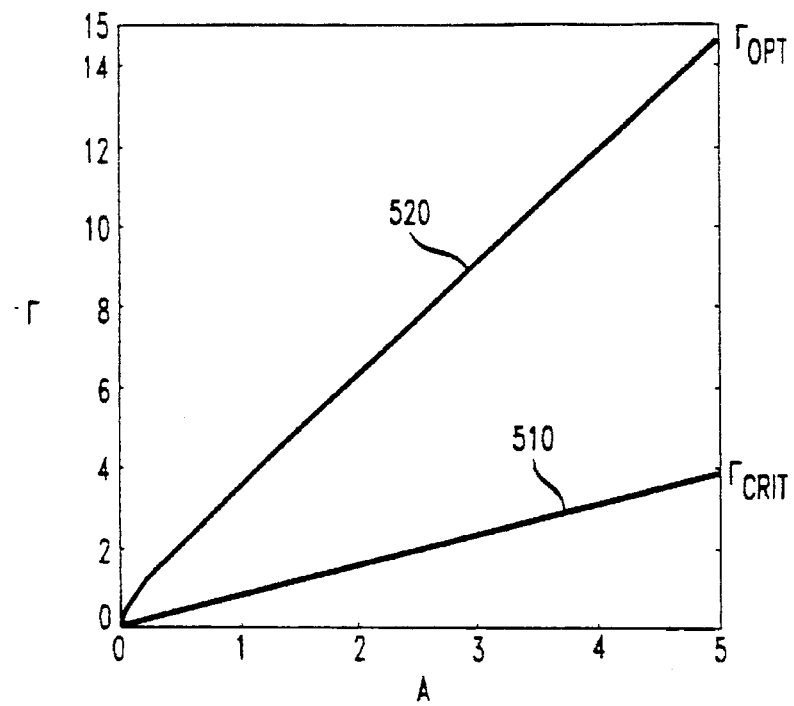
FIG. 5 illustrates a set of regions in which the ratio of a damping constant to a gain parameter may lie.

FIG. 4 illustrates the steps in the inventive method. For convenience, as explained in the rigorous presentation of the inventive method in the next section, a new gain parameter A.$A=\gamma^2 a$, and a new damping constant $\Gamma$, $\Gamma=\gamma\tau$, will be introduced, where $\tau=\tau_1+\tau_2$. Assuming a VC has been established, values of A and $\Gamma$ are selected in step 420. Once selected, these values in the preferred embodiment typically remain constant for as long as the VC is established. The values of A and $\Gamma$ are selected according to several conditions as illustrated in FIG. 5. First, the ratio of A/$\Gamma$ is advantageously selected so that for a given value of A, $\Gamma > \Gamma_{crit}$ where $\Gamma_{crit}$ defines the boundary between stable and unstable operation of the method as shown by line 510 in FIG. 5 and by line 610 in FIG. 610. As explained below, stable operation means asymptotic, non-oscillatory steady state behavior where values of $\Gamma$ equal to, or in excess of, a critical value $\Gamma_{crit}$ provide such stable behavior. The ratio of A/$\Gamma$ is further advantageously selected according to a desired transient response. In particular, for a given value of A, an optimal value of $\Gamma$ termed $\Gamma_{opt}$ is given by line 520 in FIG. 5. $\Gamma_{opt}$ is the value of $\Gamma$ for which the transient behavior is "best" in the sense that the asymptotic approach to steady state is both the fastest and oscillation-free.

As explained in the next section, the value of F actually selected need not be $\Gamma_{opt}$. In particular, the ratio of A/$\Gamma$ may be adjusted so as to trade dynamic range (i.e. the range over which the rate r(t) tracks available link capacity at the node as detected by decreases in buffer content) for transient response. In FIG. 5, for example, a decrease in the value of $\Gamma$ such that $\Gamma_{crit} \leq \Gamma < \Gamma_{opt}$, (i.e. a value of $\Gamma$ in the region below line 520 and above or equal to line 510) will result in an increased dynamic range but a in a slower transient response. Selection of $\Gamma > \Gamma_{opt}$ results in both a decrease in dynamic range and a slower transient response.

In step 430 a target value $\bar{x}$ is selected for the buffer level of a node through which the established VC is routed. A large $\bar{x}$ corresponds to a large delay. The value of $\bar{x}$ is selected according to the desired delay through the node where the delay is advantageously determined in terms of: the difference between the contents y of buffer 315 and the target value; the capacity C of an outgoing link connected to the node; and the fraction $\Gamma$ of the capacity guaranteed to the established VC which is related to the token rate initially contracted for. In short, delay $=C(y-\bar{x})$ F. As shown, below, the fraction of the link capacity guaranteed to a VC is a function of the gain parameter. Alternatively, the target value may also be dynamically adjusted by an intelligent node in order to improve the steady state performance and dynamic range.

Returning to FIG. 4, in step 440 a feedback signal, indicating a level of congestion at the node, is sent to an access regulator from the node and using the equations above, one or more access regulator parameters, e.g. r(t), may be adjusted within the access regulator in step 450. This process then advantageously continues for as long as the VC is established.

The inventive method extends to the case where K access regulators are connected to a node (i.e. there are K VCs routed through the node). Let $\{a_1, a_2, \ldots, a_K\}$ be a set of gain parameters where $a_i$ is the gain parameter of the $i^{th}$ connection. With $$a = \sum_{i=1}^{K} a_i$$

and with the damping parameter $\gamma$ common to all connections, A and $\Gamma$ and can be chosen as above. Then $$\frac{d}{dt} r_1(t) = -a_1[x(t-\tau_2) - \bar{x}] - \gamma r_1(t)$$

$$\frac{d}{dt} r_2(t) = -a_2[x(t-\tau_2) - \bar{x}] - \gamma r_2(t)$$

.
.
.

$$\frac{d}{dt} r_K(t) = -a_K[x(t-\tau_2) - \bar{x}] - \gamma r_K(t)$$

The fraction of the link capacity guaranteed to the $i^{th}$ VC is $a_i/a$. Note that the fraction of the bandwidth allocated to the $i^{th}$ VC may exceed $a_i/a$ if there is unused link capacity. A more rigorous detailed presentation of the above method is presented in the next section.

A Method For Integrated Congestion Control

In this section a rigorous explanation of the inventive method is presented. In particular, the criteria for asymptotic stability of the method in terms of the gain parameter and damping constant are presented, and the trade-off between steady state behavior and transient response is detailed. The method is also extended to the case of multiple access regulators connected to a node.

The Model

First, consider a single connection between a source controlled by an access regulator and a node, see FIG. 3. Results for the single connection case generalize to the multiple connection case which is treated below. The source rate S(t) is controlled by the token rate r(t) and its maximum burst length is controlled by the token buffer size $B_T$. The regulated rate $\phi(t)$ depends on the token buffer content y(t). The buffer content of the node is x(t) and the available transmission capacity is $\mu$. Associated with the distant buffer is a target value $\bar{x}$ above which the node is considered congested. The source rate is s(t), the content of the token buffer is y(t) and the output of the regulator is $\phi(t)$. The propagation delay from the source to the node is $\tau_1$ and the propagation delay from the node to the source is $\tau_2$. The objective is to advantageously and dynamically adapt r(t) to $\mu$ while keeping x(t) at an acceptable level based on feedback information on the status of the buffer content which is received by the source. The available channel rate or capacity, $\mu$, is typically a function of cross traffic from other connections and therefore is unknown. As shown below, where multiple connections share the node, $\mu$ varies as connections are set up and terminated.

Next a class of methods is considered where the source rate varies in proportion to the difference between the buffer content and the target value $\bar{x}$. The data traffic is modeled as fluid flow. The applicability of fluid models to congestion control in ATM has been previously demonstrated in a stochastic setting and in a deterministic setting. The constancy and small size of the ATM cell makes its transmission time small compared to the total transfer time and justifies the fluid approximation. See, A. I. Elwalid and D. Mitra, Fluid Models for the Analysis and Desgin of Statistical Multiplexing With Loss Priorities on Multiple Classes of Bursty Traffic," Proc. *IEEE INFOCOM '92*, pp. 415–425, 1992; K. W. Fendick, et al.,supra.

The following set of coupled delay-differential equations describe the system evolution, $$\frac{d}{dt} x(t) = \begin{cases} \phi(t-\tau_1) - \mu \text{ if } x(t) > 0 \\ (\phi(t-\tau_1) - \mu)^+ \text{ if } x(t) = 0 \end{cases} \quad (1)$$

where, $$\phi = (t) \begin{cases} s(t) & \text{if } y(t) > 0 \\ r(t) & \text{if } y(t) = 0, \end{cases} \quad (2)$$

$$\frac{d}{dt} r(t) = -a[x(t-\tau_2) - \bar{x}] - \gamma r(t), \quad (3)$$

and $$\frac{d}{dt} y(t) = \begin{cases} r(t) - s(t) \text{ if } y(t) > 0 \\ (r(t) - s(t))^+ \text{ if } y(t) = 0 \end{cases} \quad (4)$$

where the positive quantities a, $\gamma$ and $\bar{x}$ are the gain parameter, the damping constant and the buffer target, respectively.

It has been shown that the throughput of the access regulator is an increasing function of both the token buffer size $B_T$ and the token rate. Increasing $B_T$, however, has the added effect of increasing the burstiness of the regulated rate by increasing the period during which the regulated rate is equal the source peak rate. During this period the surge of traffic may flood network nodes. The throughput of the regulator, therefore, may be advantageously increased primarily through r(t) to achieve smooth increase in the traffic rate. The access regulator may have a data buffer to temporarily store data when the token buffer is empty and the source rate is at its peak. It has been shown that the regulator throughput depends on the token buffer size and data buffer size only through their sum. The token buffer can thus be made small at the expense of having larger data buffer. See, Elwalid and Mitra, supra.

Henceforth, $B_T$ can advantageously be considered to be small and fixed, and consider the adaptation of r(t). The token buffer comes into play only when the source turns from off to on. In this case the output of the regulator will be equal to the source peak rate until the token buffer empties, and at which it becomes equal to r(t). The token buffer has the effect of adding a small burst of peak rate at the beginning of each transmission period. The transmission periods are typically long in applications requiring large data transfers and the initial peak rate duration will be negligible. This burst period is advantageously ignored (its effect may be approximated by setting the initial rate of each transmission period to the source peak rate.) Alternatively, the source may be assumed to be always on (infinite data source) to isolate the issue of adaptation mechanism form other considerations.

According to the above observation, let $\phi(t)=r(t)$ and thereby the equations are $$\frac{d}{dt} x(t) = \begin{cases} \phi(t-\tau_1) - \mu \text{ if } x(t) > 0 \\ (\phi(t-\tau_1) - \mu)^+ \text{ if } x(t) = 0 \end{cases} \quad (5)$$

$$\frac{d}{dt} \phi(t) = -a[x(t-\tau_2) - \bar{x}] - \gamma\phi(t) \quad (6)$$

Stability Analysis

Letting $\tilde{x}(t)=x(t)-\bar{x}$ and $\tilde{\phi}=\phi(t)-\mu$ and combining (5) and (6), yields $$\frac{d^2}{dt^2} \tilde{\phi}(t) + \gamma\frac{d}{dt} \tilde{\phi}(t) + a\tilde{\phi}(t-\tau) = 0 \quad (7)$$

where $\tau=\tau_1+\tau_2$ is the round-trip propagation delay. Henceforth, let the unit of time be $\tau$ and use the new time scale t'=t/$\tau$. According to this normalization, equation (7) becomes $$\frac{d^2}{dt'^2} \tilde{\phi}(t') + \Gamma\frac{d}{dt'} \tilde{\phi}(t') + A\tilde{\phi}(t'-1) = 0 \quad (8)$$

where $\Gamma=\tau\gamma$ and $A=\gamma^2 a$. The characteristic equation associated with (8) is $$(\Gamma s+s^2)e^s+A=0 \quad (9)$$

The transcendental Equation (9) has infinite number of roots and the location of which in the complex plane determines the behavior of the equilibrium point of the dynamical system in response to small perturbation. In addition, any solution to (9) can be represented by an asymptotic series, $$\tilde{\phi}(t') = \sum_{n=1}^{\infty} p(t')e^{s_n t'} \quad (10)$$

Definition

The system is asymptotically stable if:

1—It is stable in the sense of Lyapunov.

2—Every initial solution starting near $(\phi_\infty, x_\infty)$ converges to $(\phi_\infty, x_\infty)$ as t$\to\infty$, where $(\phi_{2s}, x_\infty)$ is the equilibrium point.

For asymptotic stability all roots of (9) must have negative real parts. To find conditions on system parameters which guarante asymptotic stability, certain fundamental results on the zeros of exponential polynomials due to Pontryagen can be used. See, e.g., S. J. Bhatt and C. S. Hsu, "Stability Criteria for Second-Order Dynamical Systems With Time-Lag," Trans. ASME, Vol. E-33, pp. 113–118, 1966.

Consider the general exponential polynomial $$P(s,e^s) = \sum_{k=0}^{n} \sum_{l=0}^{m} b_{kl} s^k \{e^s\}^l = 0. \quad (11)$$

Let the proper degrees of $P(s,e^s)$ with respect to s and $e^s$ be N and M respectively. The term $b_{NM} s^N \{e^s\}^M$ is called the principal term of $P(s,e^s)$. A necessary condition for an exponential polynomial to have all its roots in the left half plane is that it has a principal term. If $s=i\omega$, equation (11) can be written as $$P(i\omega, e^{i\omega}) = F(\omega) + iG(\omega) \quad (12)$$

Theorem 1

Necessary and sufficient conditions for an exponential polynomial with principal term to have stable roots are (i) $G(\omega)$ [or $F(\omega)$] has exactly $4kM+N$ real zeros in the interval $-2k\pi+\epsilon \leq \omega \leq 2k\pi+\alpha$ a starting with sufficiently large k, and $\epsilon$ being some appropriate constant.

(ii) For each zero of $G(\omega)$ [or $F(\omega)$], denoted by $\omega_i$, $$F(\omega_i) \frac{d}{d\omega} G(\omega_i) > 0 \quad (13)$$

or, $$-G(\omega_i) \frac{d}{d\omega} F(\omega_i) > 0 \quad (14)$$

From (9), $$F(\omega) = -\alpha(\omega \cos \omega + \Gamma \sin \omega) + A \quad (15)$$

$$G(\omega) = -\omega^2 \sin \omega + \Gamma \omega \cos \omega \quad (16)$$

For stability the values of $\Gamma$ and A which will insure that $G(\omega)$ has the appropriate number of real zeros must be found. Since the principal term in (9) is $(s^2 e^s)$, $G(\omega)$ must have exactly 6 real zeros in the interval $-2k\pi+\epsilon \leq 2k\pi+\epsilon$. It is obvious that $\omega=0$ is a root of (16). To find the rest of the roots, the solutions of $\omega=\Gamma \cot \omega$ are examined. If k=1 and $\epsilon=\pi/2$, then there are 5 roots in $(-3\pi/2, 5\pi/2)$. Thus, there are a total of 6 zeros of $G(\omega)$ as required. From condition (ii), the following inequality must apply to all roots of (16), $$[(\Gamma-\omega^2)\cos \omega - (2+\Gamma)\omega \sin \omega][-\omega^2 \cos \omega - \Gamma \omega \sin \omega + A] > 0 \quad (17)$$

For $\omega=0$, (21) implies that $\Gamma A > 0$, which is consistent with the assumption that A and $\Gamma$ are positive. To apply condition (17) to other roots, it is written as $$\left( \frac{\sin^2 \omega}{\Gamma^2 \omega^2} \right)(-\omega^4 - \Gamma^2 \omega^2 - \Gamma \omega^2)\left( -\omega^4 - \omega^2 \Gamma^2 + \Gamma A \frac{\omega}{\sin \omega} \right) > 0 \quad (18)$$

which implies that $$-\omega^4 - \omega^2 \Gamma^2 + \Gamma A \frac{\omega}{\sin \omega} < 0 \quad (19)$$

Since $\omega$ is a zero of (16), (19) becomes $$A \frac{\sin \omega}{\omega} < \Gamma \quad (20)$$

Note that in (20) $\omega \in [0,\pi]$ gives the tightest bound on $\Gamma$ for a given A. Equation (20) is satisfied for all zeros $\{\omega_i\}$ of $G(\omega)$ if and only if it is satisfied for $\omega \in [0,\pi]$. Hence, Theorem 2

Figure 6:
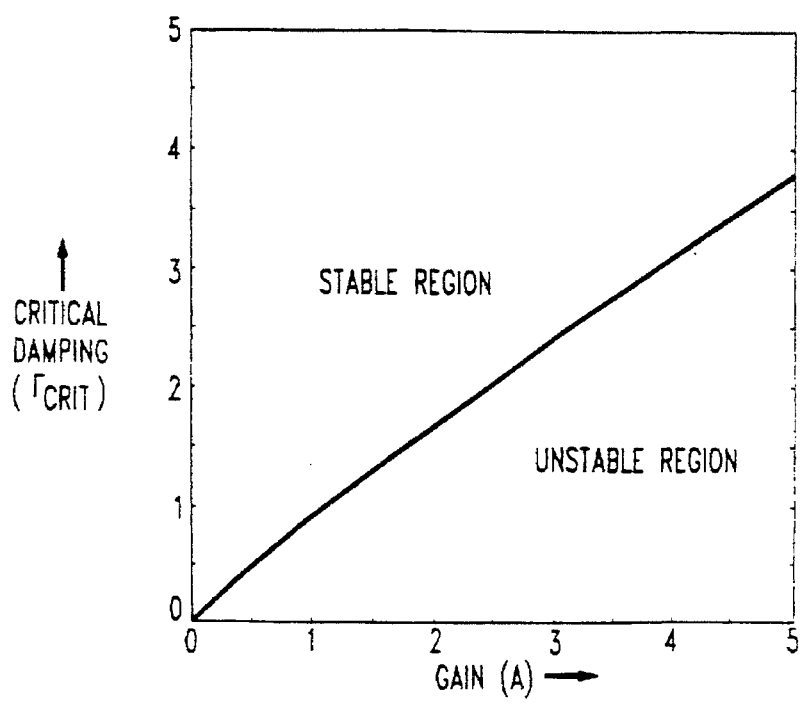
FIG. 6 is a plot of a normalized critical damping parameters as a function of a gain parameter.

The delay-differential equation (7) is asymptotically stable if and only if $$A \frac{\sin \omega_1}{\omega_1} < \Gamma, \quad (21)$$

where $\omega_1$ is the unique solution of $$\gamma = \omega \tan \omega. \quad (22)$$

in the interval $(0,\pi)$. FIG. 6 gives a plot of the critical damping $\Gamma_{crit}$ as a function of A, where $\Gamma_{crit}$ is the infimum of values of $\Gamma$ satisfying the stability conditions for a given A.

Principal Root and Rate of Stabilization

In this section the rate at which a stable system approaches steady state is determined. In this connection consider the principal root $s^*$, which is the root of (9) having the largest real part. It then follows from (10) that $$\phi(t') \sim Ce^{s^*t'} \quad (23)$$

i.e., the ratio of the left hand and the right hand sides asymptotically approaches unity. Also from (10)

$$\|\phi(t')\| c e^{Re(s^*)t'} > 0 \quad (24)$$

where c is a suitably chosen constant taking into account initial conditions.

Let $s^* = -\lambda \pm i\beta$, it then follows that $-1/\lambda$ can be taken as the time constant of the dynamic method, i.e., the time it takes for a small perturbation around the steady-state value to decrease by a factor of $e^{-1}$. Prior work which found the principal root of a system of delay-differential equations and the principal root for first-order delay-differential equations in a different context are: D. Mitra and A. Weiss, "Analysis of Dealy Differential Equations Arising in Communication Network Synchronization," *Proc. IEEE Int. Symp. Circuits Syst.* pp. 839–843, Apr. 1980, D. Mitra "Network Synchronization: Analysis of Hybrid master-Slave and Mutual synchronization," *IEEE Trans. Comm.*, Vol. COM-28, No. 8, pp. 1245–1259, 1980, and F. Brauer, "Decay Rates for Solutions of a Class of Differential-Difference Equations," *SIAM J. math. Anal.*, Vol. 10, No. 4, pp. 783–788, 1979.

First determine $\lambda$, the real part of $s^*$, and then determine the imaginary part $\beta$. The change of variable $s=s'-\sigma$ transforms the characteristic equation (9) to $$[s'^2 + s'(\Gamma 2\sigma + (\sigma^2 - \sigma \Gamma)]e^{s'} + Ae^\sigma = 0 \quad (25)$$

If $\sigma$ is chosen to be the supremum of positive real numbers for which the transformed characteristic equation (25) has all roots in the left half plane, then $\lambda = -\sigma$. The conditions for the roots of (25) to be in the left half plane can be derived using Theorem 1. These conditions are given as a set of separate inequalities:

$$\sigma(\sigma - \Gamma) < 0 \quad (26)$$

$$(2\sigma - \Gamma) < \sigma(\sigma - \Gamma) \quad (27)$$

$$\sigma(\Gamma - \sigma) < Ae^\sigma \quad (28)$$

$$\frac{\sin \omega}{\omega} Ae^\sigma < (\Gamma - 2\sigma) \quad (29)$$

where $\omega_1$ is the unique solution of $$\frac{\tan \omega}{\omega} (\omega^2 + \sigma(\Gamma - \sigma))(\Gamma - 2\sigma) = 0 \quad (30)$$

in the interval $(0,\pi)$. Now choose $\sigma$ to be the supremum of positive real numbers satisfying (26)–(29). According to (29) alone, $\sigma = \Gamma/2$. Next consider inequality (27) which can be rewritten as $$\sigma^2 - \sigma(\Gamma+2) + \Gamma > 0 \quad (31)$$

Therefore, (31) is satisfied if $\sigma < \sigma_1$ or $\sigma > \sigma_2$ where $$\sigma_{2,1} = \sigma = (\Gamma/2 + 1) \pm \sqrt{(\Gamma/2)^2 + 1} \quad (32)$$

Note that $\sigma_1 < \Gamma/2 < \sigma_2$. Hence (27) restricts $\sigma$ to be in the range $(0, \sigma_1)$. Now consider condition (28) written as $$\sigma(\Gamma - \sigma)e^{-\sigma} < A \quad (33)$$

The left hand side of (33) has a maximum at $\sigma_1$ and is monotonically increasing with $\sigma$ in the range $(0, \sigma_1)$. Hence, if (33) is not satisfied for $\sigma = \sigma_1$ then the solution of (33) in $\sigma$, where the inequality is replaced with equality, is the supremum of $\sigma$ satisfying conditions (26)–(28); otherwise (33) (or (28)) is irrelevant (i.e., places no restrictions on $\sigma$.)

Now consider condition (29). To investigate the behavior of $\omega_1$ as a function of $\sigma$, denote the left hand side of (30) by $f(\omega, \sigma)$, i.e.

$$f(\omega, \sigma) = \frac{\tan\omega}{\omega}(\omega^2 + \sigma(\Gamma - \sigma)) - (\Gamma - 2\sigma) = 0 \quad (34)$$

Observe that $$\lim_{\omega \to 0} f(\omega, \sigma) = -(\sigma^2 - \sigma(\Gamma + 2) + \Gamma). \quad (35)$$

The right hand side of (35) is the negative of the left hand side of (30). Also, $$\lim_{\omega \to \pi/2^-} f(\omega, \sigma) = \infty \quad (36)$$

$$\lim_{\omega \to \pi/2^+} f(\omega, \sigma) = -\infty \quad (37)$$

$$\lim_{\omega \to \pi} f(\omega, \sigma) = 0. \quad (38)$$

Since $\partial f(\omega, \sigma)/\partial \omega > 0$, it follows that there is a solution of (30) in $(0, \pi/2)$, denoted by $\omega_1$, if $\lim_{\omega \to 0} f(\omega, \sigma) < 0$ (or $\sigma < \sigma_1$, where $\sigma_1$ is defined in (32)). Implicit differentiation of (34) gives $d\omega_1/d\sigma < 0$. Thus, $\omega_1$ is monotonically decreasing function of $\sigma$.

Now consider equation (29) rewritten below for ease of reference, $$\frac{\sin\omega_1}{\omega_1} Ae^\sigma < \Gamma - 2\sigma \quad (39)$$

Note that increasing $\sigma$ in the range $(0, \sigma_1)$ increases the left hand side of (39) and decreases its right hand side. Hence, (39) could be relevant (imposes a restriction on $\sigma$). Recall that the largest $\sigma$ for which a solution $\omega \in (0, \pi)$ of (30) exists is $\sigma_1$, giving $\omega_1 = 0^+$. Thus, (39) is irrelevant if $Ae^{\sigma_1} < (\Gamma - 2\sigma_1)$. If $Ae^{\sigma_1} \geq (\Gamma - 2\sigma_1)$, the supremum of $\sigma$ satisfying (39) is in $(0, \sigma_1)$ and can be obtained by solving (39) with equality instead of inequality. Observe further that $$\Gamma - 2\sigma_1 = \sigma_1(\Gamma - \sigma_1). \quad (40)$$

Therefore, if (39) is relevant then condition (28) is irrelevant and vice versa; the relevant of the two gives the desired $\sigma$, where $-\sigma$ is the real part of the principal root $s^*$.

Now find $\beta$, the imaginary part of $s^*$. If $s = -\sigma + i\beta$ is substituted in the characteristic equation (9) and the real and imaginary parts equated, then $$\sigma(\sigma - \Gamma) + Ae^\sigma \cos\beta - \beta^2 = 0 \quad (41)$$

$$\beta(\Gamma - 2\sigma) - Ae^\sigma \sin\beta = 0 \quad (42)$$

If $\sigma \in (0, \sigma_1)$ is obtained from (32) then upon substitution of (28) in (41) $\beta = 0$ is obtained. If $\sigma$ is obtained from (39) then upon substitution of (39) in (42) $\beta = \omega_1 \in (0, \pi/2)$ is obtained.

Theorem 3

If for a stable system the condition $\sigma_1(\Gamma - \sigma_1) > Ae^{\sigma_1}$ is satisfied, where $\sigma_1$ is given by (32), then $\sigma$, the negative of the real part of the principal root, is the unique solution of $$\sigma(\Gamma - \sigma) = Ae^\sigma, \quad (43)$$

in $(0, \sigma_1)$, and $\beta$, the imaginary part of the principal root, is zero.

If the condition is not satisfied, then $\sigma$ is the unique solution in $(0, \sigma_1)$ of $$\frac{\sin\omega_1}{\omega_1} Ae^\sigma = \Gamma - 2\sigma, \quad (44)$$

where $\omega_1$ is the unique solution of $$\frac{\tan\omega}{\omega}[\omega^2 + \sigma(\Gamma - \sigma)] - (\Gamma - 2\sigma) = 0, \quad (45)$$

in $(0, \pi/2)$, and $\beta = \omega_1$.

Dependence of the Principal Root on the Damping Coefficient

In this section the dependence of the principal root on the damping coefficient, $\Gamma$ is examined when all other control parameters are held constant. The value of $\Gamma$ which gives optimum transient behavior can then be determined. From Theorem 3, if $\sigma$ satisfies (43), and hence $\beta = 0$, then implicit differentiation of (43) gives $d\sigma/d\Gamma < 0$. If $\sigma$ satisfies (44) then $d\sigma/d\Gamma > 0$ and $d\beta/d\Gamma < 0$. Therefore, Theorem 4 if $\Gamma < \Gamma_{opt}$ then $\frac{d\sigma}{d\Gamma} > 0$ and $\frac{d\beta}{d\Gamma} < 0$ if $\Gamma > \Gamma_{opt}$ then $\frac{d\sigma}{d\Gamma} < 0$ and $\beta = 0$ where $\Gamma_{opt}$ is the solution to $$\sigma_1(\Gamma - \sigma_1) = Ae^{\sigma_1}$$

and $\sigma_1$ is defined in (32). The largest possible $\sigma$, denoted by $\sigma^*$, is obtained when $\Gamma = \Gamma_{opt}$ and is given by $$\sigma^* = (\Gamma_{opt}/2 + 1) - \sqrt{(\Gamma_{opt}/2)^2 + 1}$$

Theorem 4 specifies the damping coefficient, $\Gamma_{opt}$, which gives the optimal transient behavior of the inventive method in the sense that the asymptotic approach to steady state is fastest and oscillation-free.

Figure 7:
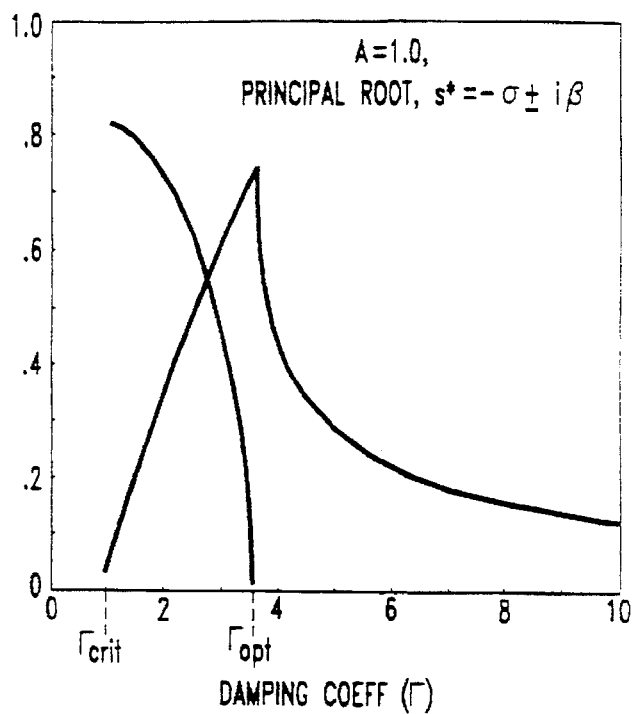
FIG. 7 is a plot of a principal root versus a damping constant.

FIG. 7 depicts the principal root as a function of $\Gamma$.

Steady-State Response and Dynamic Range of Adaptation

In this section the steady-state behavior of the inventive method is studied. Two basic measures which describe the steady-state performance are the throughput and delay. The steady-state throughput is denoted by $\phi_\infty$ and the steady-state delay is inferred form $x_\infty$ the steady-state value of the buffer content. An important feature of the inventive method is its dynamic range, which is the range over which the input rate tracks the available channel capacity at the node. It will be shown that the three quantities: throughput, delay and dynamic range are interdependent. Consider the inventive method with buffer floor, and assume here that the method with no buffer floor is made asymptotically stable with an appropriate selection of the gain and damping parameters. For asymptotic stability, $(dx(t)/dt) \to 0$ and $(d\phi(t)/dt) \to 0$. Hence, $\phi_\infty - \mu = 0$ if $x_\infty > 0$ (46)

$[\phi_\infty - \mu]^+ = 0$ if $x_\infty = 0$ (47)

$-\gamma \phi_\infty - a(x_\infty - \bar{x}) = 0$ (48)

First consider solutions with $x_\infty = 0$. From (47) and (48)

$$\phi_\infty = \frac{a\bar{x}}{\gamma}$$ (49)

$$\phi_\infty - \mu \leq 0$$ (50)

Hence using (46) yields $A\bar{x}/\Gamma \leq \mu$. Thus one set of solutions to (46)–(48) is:

$$\frac{A\bar{x}}{\Gamma} \leq \mu; \ x_\infty = 0; \ \phi_\infty = \frac{A\bar{x}}{\Gamma}$$ (51)

Now consider solutions with $x_\infty > 0$. Similarly, another set of solutions is obtained:

$$\mu < \frac{A\bar{x}}{\Gamma}; \ x_\infty = \bar{x} - \frac{\Gamma \mu}{A}; \ \phi_\infty = \mu.$$

Hence, the following result
Proposition 1
 The only steady-state solutions are $$\left\{ x_\infty = \bar{x} - \frac{\Gamma \mu}{A}; \ \phi_\infty = \mu \right\} \text{ if } \mu < \frac{A\bar{x}}{\Gamma}$$ (52)

$$\left\{ x_\infty = 0; \ \phi_\infty = \frac{A\bar{x}}{\Gamma} \right\} \text{ if } \mu \geq \frac{A\bar{x}}{\Gamma}$$ (53)

Figure 8:
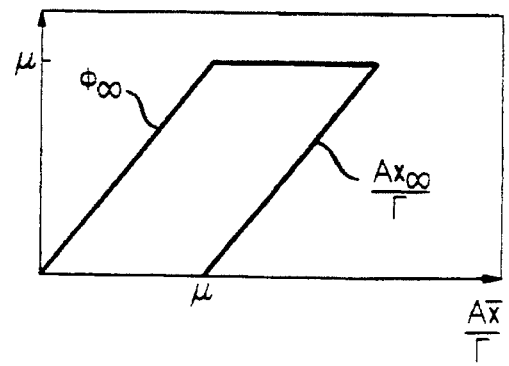
FIG. 8 is a plot of a relationship between delay, throughput and dynamic range based on a set of parameters.

FIG. 8 illustrates the dependence of the steady-state solution on the control parameters. First note that the optimal performance in the sense of maximizing throughput and minimizing buffer content is obtained if $\mu$ is equal to $A\bar{x}/\Gamma$. Thus, $A\bar{x}/\Gamma$ can be viewed as the upper limit of the dynamic range of the method, i.e. the maximum value that $\phi_\infty$ can attain. Thus, if $A\bar{x}/\Gamma < \mu$, the case of insufficient dynamic range, $\phi_\infty$ is limited to $A\bar{x}/\Gamma$ and $x_{2\beta} = 0$. If, on the other hand, $A\bar{x}/\Gamma > \mu$, the case of excessive dynamic range, $\phi_{2\beta} = \mu$ and $x_\infty > 0$. The optimum performance is achieved when $A\bar{x}/\Gamma = \mu$, giving $\phi_\infty = \mu$ and $x_\infty = 0$. When there are multiple connections sharing the node, as is the case in practice, the residual capacity available to a given connection $\mu$ is changing with time as connections are set up and terminated. If a large enough dynamic range is sought such that $\phi_{2\beta} = \mu$ then $A\bar{x}/\Gamma$ must be as large as $\mu$ can get. The increase in $A\bar{x}/\Gamma$ will be achieved primarily by increasing $\bar{x}$, since the ratio $A/\Gamma$ is limited by the stability conditions. From Proposition 1 this implies large $x_\infty$. Therefore, there is a tradeoff between dynamic range and steady-state behavior.

Figure 9:
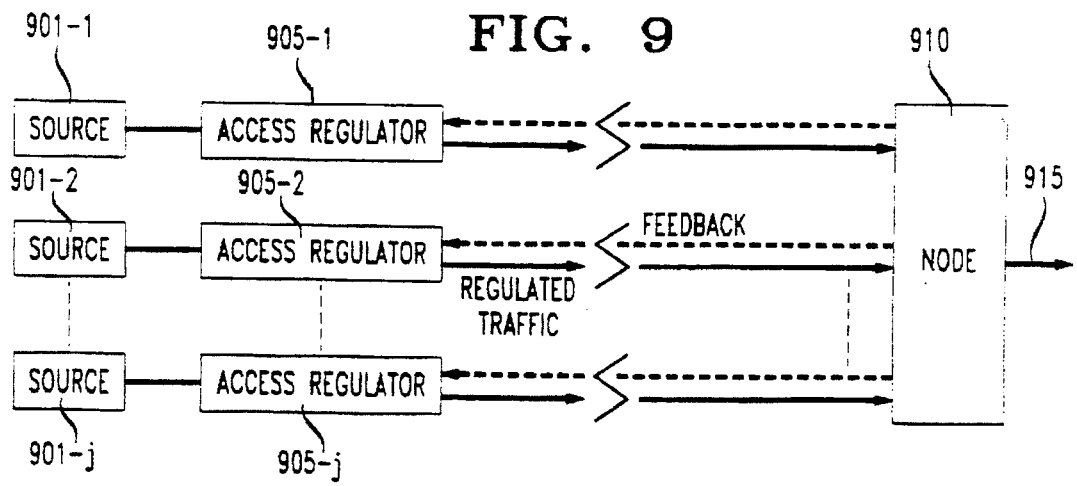
FIG. 9 illustrates operation of the inventive method for multiple communication devices connected to a node.

Multiple Connections:

Now extend the analysis of the inventive method to the case where multiple communication devices share a node as shown in FIG. 9. The partition of the available capacity $\mu$ in link 915 among communication devices 901-k connected to access regulators 905-k will be accomplished through a set of gain parameters $\{a_1, a_2, \ldots, a_K\}$, where $a_i$ is the gain parameter of the $i_{th}$ communication device, and K is the number of communication devices. The damping parameter $\gamma$ is common to all communication devices. The node buffer in node 910 is shared by all communication devices and the service discipline is assumed FIFO. The following equations describe the evolution of the method $$\frac{d}{dt} x(t) = \begin{cases} \Sigma_i \phi_i(t - \tau_1) - \mu & \text{if } x(t) > 0 \\ \left( \Sigma_i \phi_i(t - \tau_1) - \mu \right)^+ & \text{if } x(t) = 0 \end{cases}$$ (54)

$$\frac{d}{dt} \phi_1(t) = -a_1[x(t - \tau_2) - \bar{x}] - \gamma \phi_1(t)$$ (55)

$$\frac{d}{dt} \phi_2(t) = -a_2[x(t - \tau_2) - \bar{x}] - \gamma \phi_2(t)$$ (56)

(57)

(58)

$$\frac{d}{dt} \phi_K(t) = -a_K[x(t - \tau_2) - \bar{x}] - \gamma \phi_K(t)$$ (59)

The stability condition of the inventive method is identical to those obtained for the single communication device case with $(a = \Sigma_i a_i)$. There is a common rate of adaptation for all communication devices which is obtained from the principal root of the characteristic equation associated with the global system. The steady-state value of each communication device will depend on its gain parameter. In particular $$\left\{ x_\infty = \bar{x} - \frac{\Gamma \mu}{A_i}; \ \phi_{i\infty} = \frac{A_i}{A} \mu \right\} \text{ if } \mu < \frac{A\bar{x}}{\Gamma}$$ (60)

$$\left\{ x_\infty = 0; \ \phi_{i\infty} = \frac{A_i \bar{x}}{\Gamma} \right\} \text{ if } \mu > + \frac{A\bar{x}}{\Gamma}$$

where $A_i = a_i \pi 2$, $\Gamma = \pi \gamma$ and $$A = \Sigma_i A_i.$$

Conclusion

This disclosure describes methods for integrated congestion control in networks. While the above teaching of the present invention has been in terms of controlling a parameter of an access regulator, those skilled in the art will recognize the applicability of this teaching to other specific contexts. For example, the damping constant and gain parameters may be periodically updated and the access regulator parameters adjusted as a function of the updates.

The methods disclosed herein have been described without reference to specific hardware or software. Instead, the methods have been described in such a manner that those skilled in the art can readily adopt such hardware and software as may be available or preferable for a particular application.

I claim:

1. A method of setting a value r for a token rate parameter of an access regulator, wherein said access regulator controls admission of information from a communication device to a network and wherein said network comprises a node, the method comprising the steps of:

receiving a signal at said access regulator from said node, said node comprising a buffer characterized by a buffer content level, said signal indicating the buffer content level of said node relative to a target level $\bar{x}$, and setting said value r for said token rate parameter at a time $(t+\Delta)$ based on a difference of a first value based on the rate $r(t)$ at time t and a second values based on said signal indicating the relative buffer content, respectively, wherein said first value corresponds to the rate r at time t scaled by the complement of damping parameter $\gamma$ as scaled by time difference $\Delta$ and said second value corresponds to said relative buffer content scaled by gain parameter a and the time difference $\Delta$, wherein the damping and gain parameters $\gamma$ and a substantially satisfy the expression $$\frac{\sin\omega}{\omega} < \frac{\gamma}{a\tau},$$

where $\gamma=\omega\tan\omega$ and $\tau$ is a propagation delay between said node and said access regulator.

2. In a network comprising a node and a set of K information sources, wherein the $k^{th}$ source in said set of K information sources is connected to a respective $k^{th}$ access regulator, wherein each access regulator is connected to said node, and wherein the $k^{th}$ access regulator is characterized by a rate, $r_k(t)$, at which information from the $k^{th}$ source is admitted to said network by said $k^{th}$ access regulator, a method comprising the steps of:

receiving a signal at each access regulator from said node, said node comprising a buffer characterized by a buffer content level, said signal indicating said buffer content level relative to a target value; and setting the rate $r_k(t)$ of said $k^{th}$ access regulator at a time $(t+\Delta)$ based on a difference of a first value based on the rate $r_k(t,)$ at time t of said $k^{th}$ access regulator and a second value based on said signal indicating the relative buffer content, respectively, wherein said first value corresponds to the current rate $r(t)$ scaled by the complement of damping parameter $\gamma$ as scaled by time difference $\Delta$ and said second value corresponds to said relative buffer content scaled by a gain parameter $a_k$ and the time difference $\Delta$, wherein the damping and gain parameters $\gamma$ and $a_k$ substantially satisfy the expression $$\frac{\sin\omega}{\omega} < \frac{\gamma}{\sum\limits_{k=1}^{K} a_k\tau},$$

where $\gamma=\omega\tan\omega$ and $\tau$ is a propagation delay between said node and said access regulator.

3. The method of claim 1 wherein the damping and gain parameters $\gamma$ and a, and the target level $\bar{x}$ further satisfy the expression $$\gamma = \frac{a\tau}{\sigma_1} e^{\sigma_1} - \sigma_1,$$

where $$\sigma_1 = \left(\frac{\gamma\tau}{2}+1\right) - \sqrt{\left(\frac{\gamma\tau}{2}\right)^2 + 1}.$$

4. The method of claim 1 wherein values of the damping and gain parameters $\gamma$ and a, and the target level $\bar{x}$ are such that $$\frac{a\tau\bar{x}}{\gamma}$$

is a value between a committed transmission rate and a substantially greatest realizable transmission rate.

5. The method of claim 1 wherein the damping and gain parameters $\gamma$ and $a_k$, and the target level $\bar{x}$ further satisfy the expression $$\gamma = \sum_{k=1}^{K} \frac{a_k\tau}{\sigma_1} e^{\sigma_1} - \sigma_1,$$

where $$\sigma_1 = \left(\frac{\gamma\tau}{2}+1\right) - \sqrt{\left(\frac{\gamma\tau}{2}\right)^2 + 1}.$$

6. The method of claim 2 wherein the damping and gain parameters $\gamma$ and $a_k$, and the target level $\bar{x}$ are such that $$\frac{\sum\limits_{k=1}^{K} a_k\tau\bar{x}}{\gamma}$$

is a value between a sum of committed transmission rates and substantially greatest realizable transmission rates for said access regulator through said node.

7. The method of claim 2 wherein the rate $r_k(t)$ for the $k^{th}$ access regulator is proportional to the gain ratio $$\frac{a_k}{\sum\limits_{k=1}^{K} a_k}.$$

* * * * *